US008613067B2

(12) United States Patent
Lambiase et al.

(10) Patent No.: US 8,613,067 B2
(45) Date of Patent: Dec. 17, 2013

(54) SINGLE SIGN ON WITH MULTIPLE AUTHENTICATION FACTORS

(75) Inventors: Mark V. Lambiase, Ladera Ranch, CA (US); Garret Florian Grajek, Aliso Viejo, CA (US); Jeffrey Chiwai Lo, Irvine, CA (US); Tommy Ching Hsiang Wu, Irvine, CA (US)

(73) Assignee: SecureAuth Corporation, Irvine, CA (US)

( * ) Notice: Subject to any disclaimer, the term of this patent is extended or adjusted under 35 U.S.C. 154(b) by 365 days.

(21) Appl. No.: 12/948,037

(22) Filed: Nov. 17, 2010

(65) Prior Publication Data

US 2011/0119747 A1 May 19, 2011

Related U.S. Application Data

(60) Provisional application No. 61/262,102, filed on Nov. 17, 2009.

(51) Int. Cl.
*H04L 29/06* (2006.01)

(52) U.S. Cl.
USPC .......................................................... 726/8

(58) Field of Classification Search
None
See application file for complete search history.

(56) References Cited

U.S. PATENT DOCUMENTS

| 4,868,877 | A | 9/1989 | Fischer |
| 5,881,226 | A | 3/1999 | Veneklase |
| 5,999,711 | A | 12/1999 | Misra et al. |
| 6,026,166 | A | 2/2000 | LeBourgeois |
| 6,035,406 | A | 3/2000 | Moussa et al. |
| 6,324,645 | B1 | 11/2001 | Andrews et al. |
| 7,120,929 | B2 | 10/2006 | Beattie et al. |
| 7,127,607 | B1 | 10/2006 | Su et al. |
| 7,131,009 | B2 | 10/2006 | Scheidt et al. |
| 7,137,006 | B1 * | 11/2006 | Grandcolas et al. .......... 713/180 |
| 7,140,036 | B2 | 11/2006 | Bhagavatula et al. |
| 7,143,286 | B2 | 11/2006 | Brown et al. |
| 7,296,290 | B2 * | 11/2007 | Barriga et al. ..................... 726/8 |
| 7,739,744 | B2 * | 6/2010 | Burch et al. ..................... 726/26 |
| 8,032,932 | B2 * | 10/2011 | Speyer et al. ..................... 726/9 |
| 8,327,426 | B2 * | 12/2012 | Kinser et al. ..................... 726/8 |
| 2002/0133723 | A1 * | 9/2002 | Tait ............................... 713/201 |
| 2003/0163733 | A1 | 8/2003 | Barriga-Caceres et al. |
| 2004/0187018 | A1 * | 9/2004 | Owen et al. .................. 713/200 |
| 2005/0154913 | A1 * | 7/2005 | Barriga et al. ................ 713/201 |

(Continued)

OTHER PUBLICATIONS

Authentication in an Internet Banking Environment; Federal Financial Institutions Examination Council; 2001, 14 pages.

(Continued)

*Primary Examiner* — Oscar Louie
(74) *Attorney, Agent, or Firm* — Knobbe, Martens Olson & Bear LLP

(57) ABSTRACT

The authentication of a client to multiple server resources with a single sign-on procedure using multiple factors is disclosed. One contemplated embodiment is a method in which a login session is initiated with the authentication system of a primary one of the multiple server resources. A first set of login credentials is transmitted thereto, and validated. A token is stored on the client indicating that the initial authentication was successful, which is then used to transition to a secondary one of the multiple resources. A second set of login credentials is also transmitted, and access to the secondary one of the multiple resources is granted on the basis of a validated token and second set of login credentials.

19 Claims, 4 Drawing Sheets

(56) References Cited

U.S. PATENT DOCUMENTS

| | | | |
|---|---|---|---|
| 2007/0174243 A1 | 7/2007 | Fritz | |
| 2007/0174905 A1 | 7/2007 | Martherus et al. | |
| 2007/0234408 A1* | 10/2007 | Burch et al. | 726/6 |
| 2007/0294752 A1* | 12/2007 | Kinser et al. | 726/8 |
| 2008/0148351 A1 | 6/2008 | Bhatia et al. | |
| 2008/0263365 A1 | 10/2008 | Aupperle et al. | |
| 2009/0025074 A1 | 1/2009 | La Saint et al. | |
| 2009/0133107 A1 | 5/2009 | Thoursie | |
| 2009/0199276 A1 | 8/2009 | Schneider | |
| 2009/0249439 A1 | 10/2009 | Olden et al. | |
| 2009/0300744 A1 | 12/2009 | Guo et al. | |
| 2009/0320118 A1* | 12/2009 | Muller et al. | 726/9 |
| 2010/0050251 A1* | 2/2010 | Speyer et al. | 726/20 |
| 2011/0197070 A1 | 8/2011 | Mizrah | |

OTHER PUBLICATIONS htp://www.articsoft.com/wp_pki_intro.htm Introducton to Public Key Infrastructure, printed Jan. 26, 2007, 6 pages.

Marchesini, et al., Keyjacking: The Surprising Insecurity of Client-side SSL, Dartmouth College, Feb. 13, 2004, 16 pages.

http://www.entrust.com/pki.htm What is a PKI? Dec. 8, 2006, 5 pages.

Gutmann, Peter, Everything you Never Wanted to Know about PKI but were Forced to Find Out, University of Aukland, presentation, Aug. 2002, 48 pages.

Housley, R., et al., Network Working Group, Internet X.509 Public Key Infrastructure Certificate and Certificate Revocation List (CRL) Profile, Apr. 2002, 108 pages.

Dierks, T. et al., Network Working Group, The Transport Layer Security (TLS) Protocol Version 1.1, Apr. 2006, 88 pages.

Myers, M. et al., Network Working Group, X.509 Internet Public Key Infrastructure Online Certificate Status Protocol—OCSP, Jun. 1999, 21 pages.

Kent, S., Network Working Group, Privacy Enhancement for Internet Electronic Mail: Part II: Certificate-Based Key Management, Feb. 1993, 29 pages.

International Search Report, PCT/US 10/57070, mailed Jan. 18, 2011.

* cited by examiner

SINGLE SIGN ON WITH MULTIPLE AUTHENTICATION FACTORS

CROSS-REFERENCE TO RELATED APPLICATIONS

This application relates to and claims the benefit of U.S. Provisional Application No. 61/262,102 entitled "SYSTEM & METHOD FOR SINGLE SIGN ON WITH MULTIPLE AUTHENTICATION FACTORS" and filed Nov. 17, 2009, which is wholly incorporated by reference herein.

STATEMENT RE: FEDERALLY SPONSORED RESEARCH/DEVELOPMENT

Not Applicable

BACKGROUND

1. Technical Field

The present disclosure relates generally to methods and systems for authentication in secure data communications. More particularly, the present disclosure relates to systems and methods for single sign-on with multiple authentication factors.

2. Related Art

Numerous aspects of a person's day-to-day work and personal lives involve computers and online services accessed thereby. In order to secure personal information from unauthorized use, and to provide an individualized experience, access to such online services is established based upon user accounts and corresponding passwords. Because computer systems and online services are operated and managed by different entities, separate accounts and passwords are necessary for each. For example, a bank account is accessed separately from a credit card account, which is different from a household utilities account, and so forth. Furthermore, a typical person may have one or more separately accessed e-mail accounts, as well as different from accounts for social networking sites, blogging sites, and special interest message board sites. Even in an enterprise information technology (IT) environment, separate accounts may be necessary for a given employee's computer, e-mail server, and file server access.

Due to the large number of account names and passwords that must be remembered and entered upon demand for access to these various computing resources, many suffer from password fatigue. Even individuals with good memory can forget account identifiers and passwords, particularly those that are used only sparsely, or those that are required to have some level of complexity such as uppercase/lowercase letters, numbers, and symbols. Password fatigue oftentimes leads to users adopting individual password and account management practices that paradoxically lead to less security, than more security as intended with deploying different access control systems for each resource. One of the more common of such unsecure practices is selecting the same account identifier and password combination for each resource to which the user has access. If one of the systems is compromised such that the account name and password is known to a malicious third party, then all of the systems with the same account name and password combination are compromised. Another common practice is writing down or otherwise recording account identifiers and passwords in an unsecure medium, and storing the same in close physical proximity to a terminal that is used to access the resource. If physical security is breached to where such written account identifiers and passwords can be pilfered, then the security of those resources can also be breached. In order to make memorizing passwords easier, users may select common words or phrases that can be easily determined with a common dictionary attack.

As a solution to the password fatigue problem, and in order to simply the coordinated management and security of multiple user accounts tied to a single user or identity over multiple computing resources, single sign-on (SSO) has been developed. In general, single sign-on refers to an access control modality in which the user supplies login credentials just once without being prompted again to gain access to other, related computing resources. Conventional single-sign on implementations treat each component as an independent secondary security domain, but with the user initially accessing a primary domain to establish a secured session therewith.

Access to the additional resources is through the primary domain, and can occur in one of several ways. In one known method, the credentials provided to access the primary domain are directly passed on to the secondary domain for immediately signing on thereto. Alternatively, the credentials for the primary domain are used to retrieve other account name and password information for the secondary stored thereon, and then provided to the secondary domain upon requesting access without prompting the user for manual entry.

Providing access to a server by an unknown client, or supplying access credentials from the client to an unknown server, over an open network environment, raises several security concerns. The server must be assured that the client is what it asserts it is, and the client must be assured that the server is what it asserts it is. One conventional authentication or initial login process for the user to gain access to the primary domain involves verification of the user with the account identifier and the corresponding password, which is only one factor. The secret nature of passwords, at least in theory, is intended to prevent unauthorized access. However, simple password protection is ineffective because they can be mistakenly revealed, and are susceptible to brute-force attacks. Besides what the user knows, that is, the password for an account, other authentication factors including what the user has (hardware access control devices, security certificates downloaded to a client device after verification via hardware devices and the like) and what the user is (biometrics such as fingerprints and retinas) are utilized. Multiple authentication factors are understood to decrease the likelihood of unauthorized access.

Existing implementations of single sign-on that utilize multiple authentication factors is deficient in several respects. One problem is the required use of particular application programming interfaces (APIs) along with the complexities of integration attendant thereto. Furthermore, system administrators must oftentimes manage and audit each application/secondary domain separately because of differing password policies. Accordingly, there is a need in the art for improved single sign on with multiple authentication factors.

BRIEF SUMMARY

In accordance with various embodiments of the present disclosure, there is contemplated a method for authenticating a client to multiple server resources each with a standalone authentication system. The method may include initiating a login session with the authentication system of a primary one of the multiple server resources. Additionally, there may be a step of transmitting a first set of login credentials from the client to the authentication system of the primary one of the multiple server resources. The client may then be validated to the primary one of the multiple server resources based upon the first set of login credentials. The method may also include storing on the client a token received from the authentication system of the primary one of the multiple resources. The method may include transmitting the token and a second set of login credentials different from the first set of login credentials to a secondary one of the multiple server resources. The second set of login credentials may be retrieved from the client. There may also be a step of validating the client to the authentication system of the secondary one of the multiple server resources based upon the transmitted token and the second set of login credentials. Accordingly, the number of passwords that must be memorized by users in order to access each of the server resources is minimized, with the concomitant reduction in password-related help desk calls. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Various embodiments of the present disclosure contemplate single sign-on with multiple authentication factors. The following disclosed methods for authenticating a client to multiple resources are understood to secure and simplify access thereto by minimizing the number of separate passwords. The detailed description set forth below in connection with the appended drawings is intended as a description of the several presently contemplated embodiments of these methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
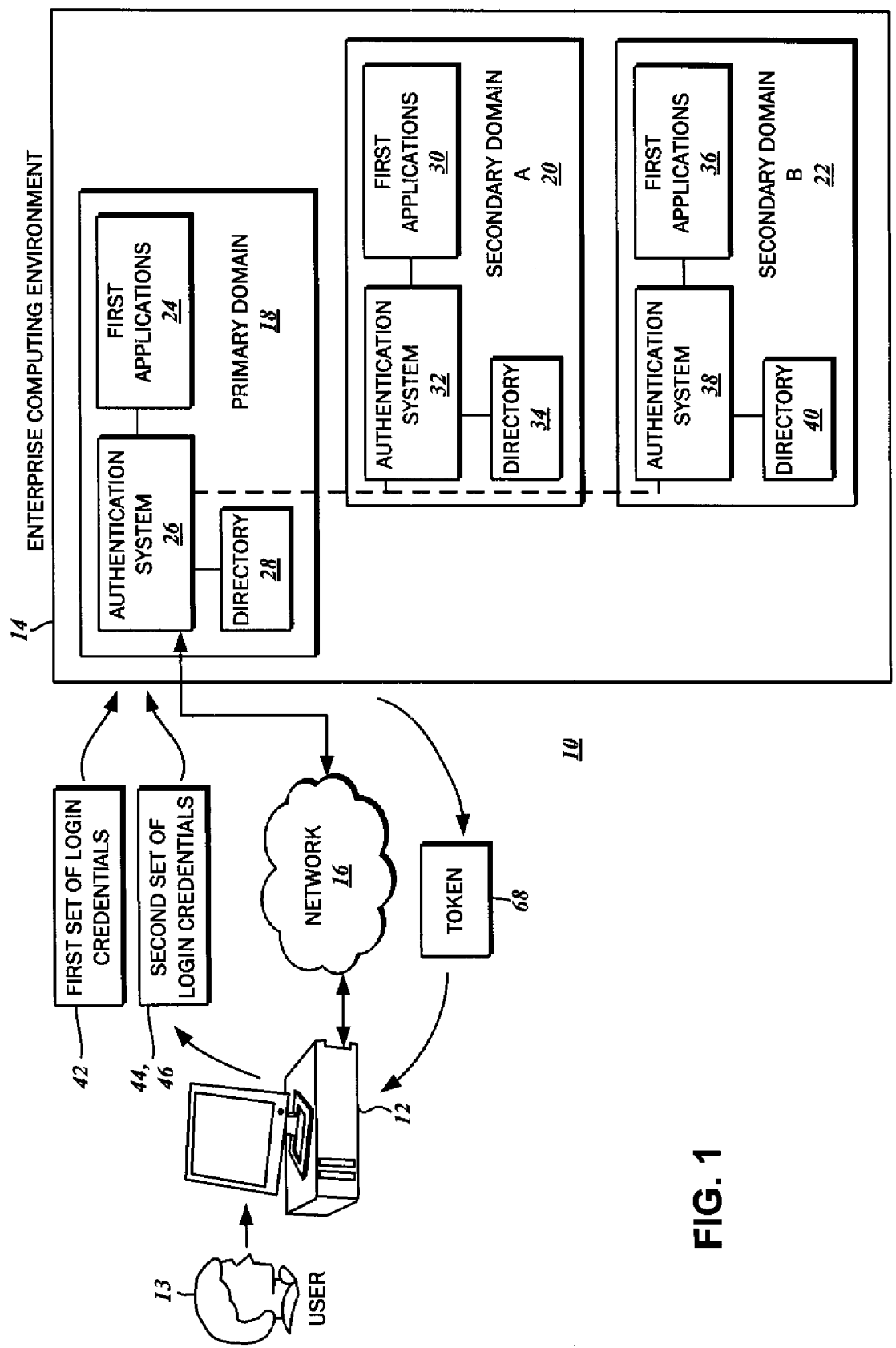
FIG. 1 is a block diagram of an exemplary networked computing environment within which various embodiments of the present disclosure may be implemented.

The block diagram of FIG. 1 illustrates an exemplary networked computing environment 10, within which the methods contemplated in accordance with various aspects of the present disclosure may be implemented. In further detail, the networked computing environment 10 includes a client computer system 12 that accesses an enterprise computing resource 14 and its constituent domains or servers over a network 16. The client computer system 12 may be a conventional desktop computer having a central processing unit, memory, and input and output devices connected thereto such as network cards, keyboards, mice, and display units. However, such particulars are presented as examples only, and any other suitable data processing hardware such as smart phones, portable computers, and the like may be readily substituted. The client computer system 12 is understood to have software instructions loaded thereon that, when executed, perform various functions in accordance with the embodiments of the present disclosure. Among these instructions is a web browser application that exchanges data with corresponding web server applications of the enterprise computing environment.

The network 16 may be an open, wide area network such as the Internet, though in some contemplated embodiments may also be a local area network. The specific implementation of the network 16 may be dependent upon the particulars of the enterprise computing resource 14. The enterprise computing resource 14 may include a series of inter-related Web applications, or Software as a Service (SaaS) applications that are executed on the client computer system 12, or any other server computing environment in which multiple, though mostly independent functionality is provided. Regardless of the identity of the constituent parts of the enterprise computing resource 14, they are understood to be "servers" in a client-server computing framework as the provider of data and/or services. This is distinguished from the client computer system 12, i.e., the "client" in the client-server computing framework as the requestor of data and/or services.

In general, the enterprise computing resource 14 may be segregated into several domains or servers with each handling a different functionality. As will be explained in greater detail below, the servers are referred to as domains as each is responsible for its own authentication of its users and security. The example shown includes a primary domain 18, a secondary domain A 20, and a secondary domain B 22, though it is expressly contemplated that any number of primary or secondary domains may be included. The primary domain 18 includes a first set of applications 24, which in one example, may be an enterprise file server. Access to the first set of applications 24 is controlled by an authentication system 26, and is limited to users with existing accounts as defined in a corresponding directory 28. The secondary domain A 20 likewise includes a second set of applications 30. Continuing with the previous example, these may be an e-mail/messaging/calendaring groupware application of the enterprise. Similar to the first set of applications 24, access to the second set of applications 30 is limited to authorized users as validated by the authentication system 32. Account data relating to such authorized users is stored in a corresponding directory 34. The secondary domain B 22 includes a third set of applications 36, which may be related to managing the financial and accounting operations of the enterprise. An authentication system 38 is understood to limit access to authorized users included in a directory 40. Although separate directories 28, 34, and 40 are presented, it will be appreciated that these may be consolidated, with the account information stored in a single, centralized repository.

The particular functions of the primary domain 18 and the secondary domains A and B, 20, 22 are presented by way of example only, and not of limitation. These domains may provide any number of services to the client computer system 12. FIG. 1 is intended to illustrate only the logical division of the security domains, and a correspondence to any particular server hardware is not implied. For instance, the primary domain 18 and the secondary domain A 20 may be running on one server hardware device, while the secondary domain 22 may be running on another server hardware device. Such hardware devices are understood to include one or more central processing units, memory, and input and output devices connected thereto like the client computer system 12, as well as executable software instructions that, among other things, perform the steps of the contemplated methods of authentication.

The security policies of the primary domain 18, as well as the secondary domains A and B 20, 22, are flexible and can be independently configured. For instance, the directories 34, 40 of the secondary domains can be configured such that only a subset of the users of the primary domain 18 can access the same. Along these lines, the directory 28 of the primary domain 18 is understood to include all of the authorized users of the enterprise computing resource 14. In a typical basic configuration, a user 13 logs in to the primary domain 18 via the authentication system 26 by providing an account identifier and its associated password in order to access the first applications 24. Subsequently, when there is a need to access the second set of applications 30 on the secondary domain A 20, there is another separate login sequence to gain access thereto, and another account identifier and its associated password are provided to the authentication system 32. In some cases, the account identifier and password of the primary domain 18 is the same as those of the secondary domain A 20 as well as the secondary domain B 22, though because there is an independent directory 34, this is not necessary and a different account identifier and password may be set for the same user.

Figure 2:
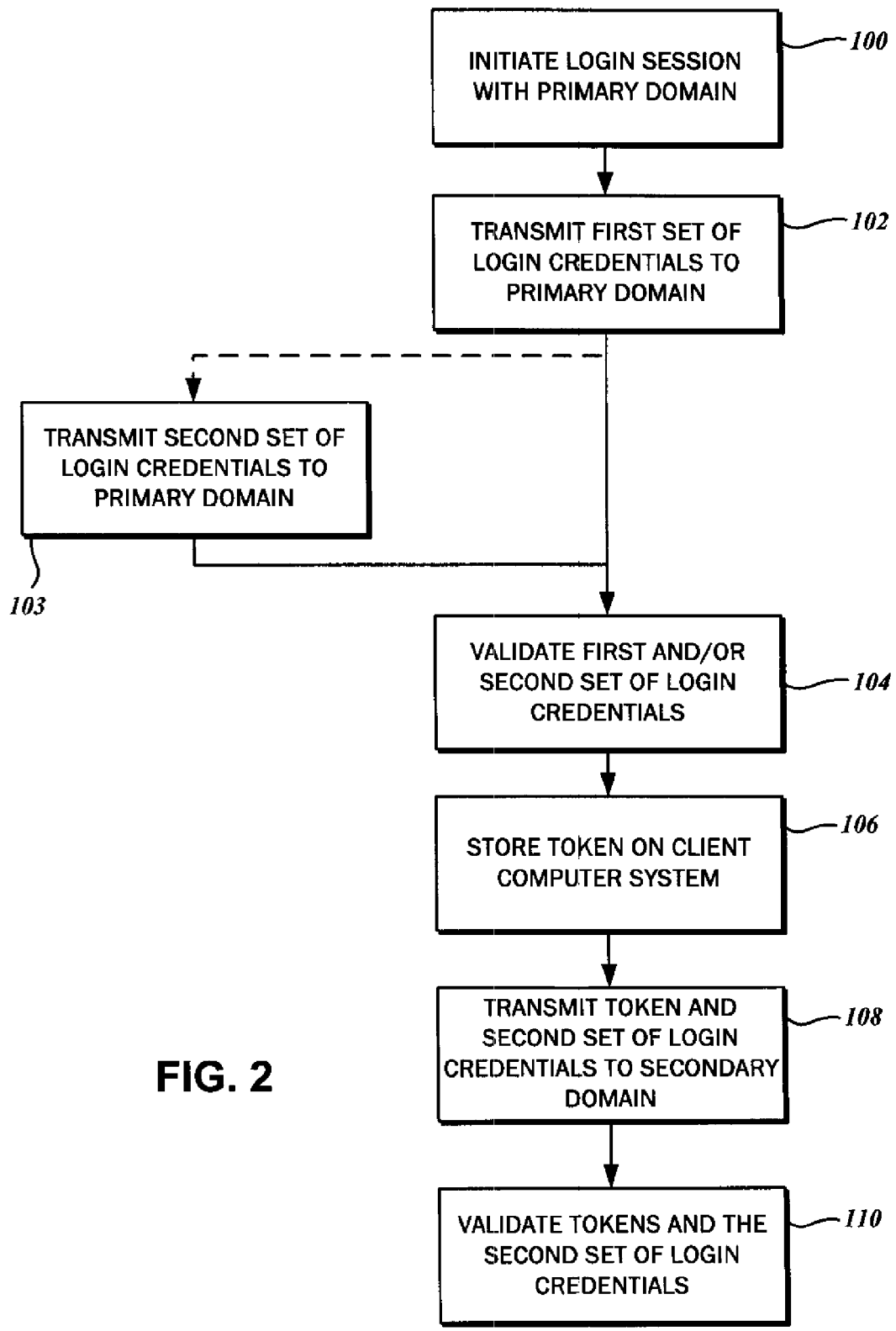
FIG. 2 is a flowchart of one method for authenticating a client to multiple server resources, relative to the client.

In the context of the foregoing exemplary network computing environment 10, with reference to the flowchart of FIG. 2, the method for authenticating the client computer system 12 to the multiple domains of the enterprise computing resource 14 will be described. One embodiment of the method begins with a step 100 of initiating a login session with the authentication system 26 of the primary domain 18. As indicated above, the applications may be delivered via the web, so the primary domain 18 is understood to include a web server with which a browser application running on the client computer system 12 exchanges data. In this case, a web page with an entry form for an account identifier and a password may be generated by the primary domain 18 for rendering by the browser application on the client computer system 12. However, any other suitable data entry modality may be readily substituted.

The method continues with a step 102 of transmitting a first set of login credentials 42 to the authentication system 26 of the primary domain 18. It is contemplated that the first set of login credentials are the aforementioned account identifier and password combination entered by the user 13 into the entry form rendered on the client computer system 12, although any other types of credentials may be utilized as the first authentication factor. The step 102 is understood to be in relation to the client computer system 12, but a corresponding step in relation to the enterprise computing resource 14 is also contemplated. With reference to the flowchart of FIG. 3, the method includes a step 200 of receiving the first set of login credentials 42 from the client computer system 12.

Preferably, though optionally, the method includes a step 103 of transmitting a second set of login credentials 44 to the primary domain 18. The corresponding method for the enterprise computing resource includes a step 201 of receiving the second set of login credentials 44 on the authentication system 26 of the primary domain 18. In some embodiments, the authentication system 26 of the primary domain 18 may require only one factor, i.e., the account identifier and password, but in most cases, the second set of login credentials 44 will be transmitted. Thus, the security and authentication processes are understood to be more in line with the processes for authenticating and accessing the other domains. The first set of login credentials 42 being generally categorized as something the purported user 31 "knows," the second set of login credentials 44, being a second authentication factor, may be something the user 31 "has" or something the user "is." The second set of login credentials 44 can thus be a certificate, a unique token and a personal identification number (PIN) or other such data stored in browser cookies and accessible variable stores. Although the second set of login credentials 44 can include data transmitted out-of-band to hardware tokens physically possessed by an authorized user, it will become apparent to those skilled in the art that such implementations may not be ideal for single sign-on, as will be explained more fully below. Such out-of-band data transmissions include text messages and phone calls.

In one contemplated embodiment, the second set of login credentials 42 is a digital certificate 46 retrievable by the client computer system 12. The digital certificate 46 may be stored on client computer system 12, or on an external data storage device connectible to the client computer system 12 such as a smart card, from which it is retrieved. Generally, the digital certificate 46 is understood to be associated with an application on the client computer system 12 that is complementary to the authentication system 26. This may be the aforementioned web browser application, which has digital certificate management features. However, it is also understood that the digital certificate 46 can be associated with another application on the client computer system 12 that is independent of the authentication system 26 of the primary domain 18. One example of such an application is the Adobe Flash platform. It will be appreciated that any other hardware or software-based identity management modality from which the digital certificate 46 is retrieved programmatically can also be utilized.

Figure 4:
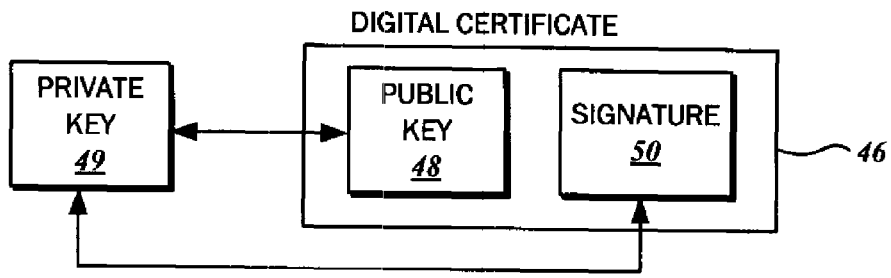
FIG. 4 is a block diagram generally illustrating a digital certificate.

As shown in the block diagram of FIG. 4, the digital certificate 46 is generally comprised of a public key 48 and a signature 50. The public key 48 corresponds to a private key 49, as public and private keys are generated in related pairs. The private key 49 remains on the client computer system 12, while the public key 48 and the signature 50 may be widely distributed. It is understood that the public key infrastructure (PKI) can be utilized to encrypt and decrypt data traffic between two systems. However, as noted previously, the digital certificates 46, which are a part of PKI, can be utilized to authenticate the transmitting party to the receiving party.

Figure 5:
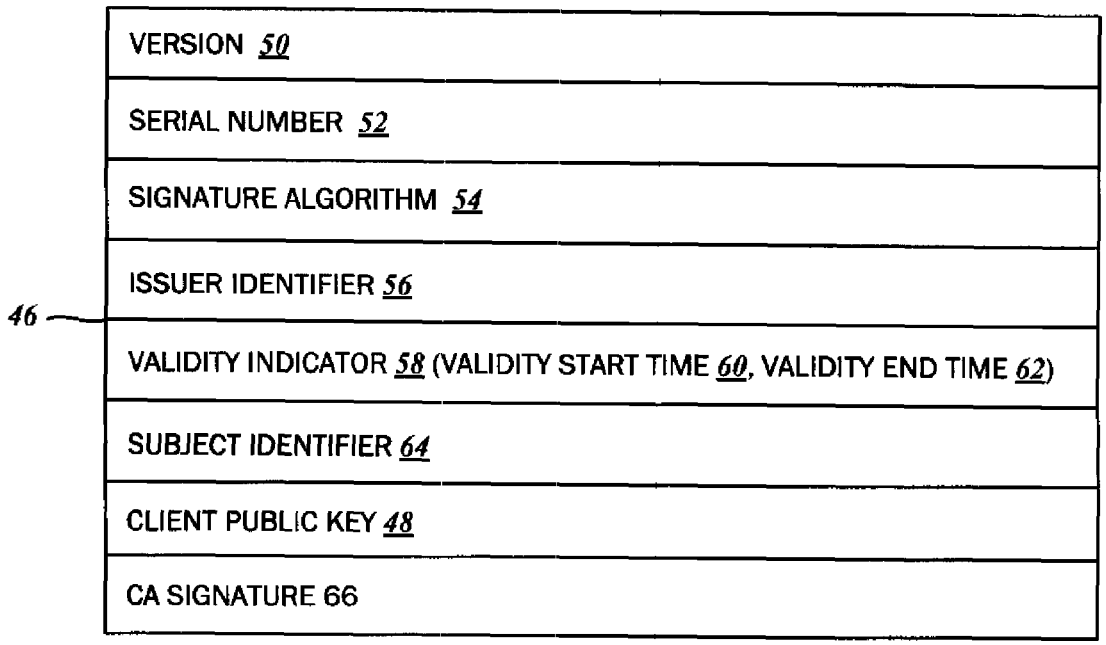
FIG. 5 is an exemplary digital certificate including various subfields thereof.

Further details of the digital certificate 46 are shown in FIG. 5, including the various fields thereof. According to one embodiment, the digital certificate 46 is an X.509 certificate. It is typically issued from a certificate authority (CA), which is a trusted third party responsible for confirming the identity of those to which it is issuing the digital certificate 46, whether that is an individual user, a specific computers or a set of computers in a network, an organization, or any other entity. Accordingly, the digital certificate 46 is signed with a digital signature 66 to validate the same to any recipients.

In addition to the public key 48, the digital certificate 46 may include, for example, a version number 50, a serial number 52, a signature algorithm 54, an issuer identifier 56, a validity indicator 58 including a validity start time 60 and a validity end time 62, and a subject identifier 64. The digital certificate 46 is typically issued from a certificate authority (CA), which is a trusted third party responsible for confirming the identity of those to which it is issuing the digital certificate 46, whether that is an individual user, a specific computers or a set of computers in a network, an organization, or any other entity. Accordingly, the digital certificate 46 is signed with a digital signature 66 to validate the same to any recipients. In further detail, the version number 50 identifies the version of the X.509 standard being using for the digital certificate 46, while the serial number 52 is understood to be a unique number assigned by a particular certificate authority. The signature algorithm 54 defines the cryptographic algorithm utilized to generate the CA signature 66 such as the Secure Hash Algorithm (SHA), Digital Signature Algorithm (DSA), and so forth. The issuer identifier 56 includes the name of the CA that issued the digital certificate 46. The validity indicator 58 defines the time period within which the digital certificate 46 may be presented as a valid and proper credential, with that time period beginning with the validity start time 60 and ending with the validity end time 62. The subject identifier 64 contains the name of a person, group, or organization to which the digital certificate 46 was issued.

The method for authenticating the client computer system 12 continues with a step 104 of validating the client to the primary domain 18 based upon the first set of login credentials 42, as well as the second set of login credentials 44 to the extent the particular implementation involved the transmission of the same in step 103. The step 104 is understood to find correspondence to the step 204 in the method for authenticating the client computer system 12 in relation to the enterprise computing resource 14. As will be recognized, the disclosed method for authenticating the client to the various domains of the enterprise computing resource 14 is premised on the second set of login credentials 44 already existing on the client computer system 12. However, if this is not the case, the authentication system 26 may direct the user 13 to enroll. It is understood that the validation and enrollment procedures are specific to the configuration of the second set of login credentials 44. In the aforementioned exemplary configuration that utilizes the digital certificate 46, a procedure for such operations is contemplated in assignee's co-pending application Ser. No. 12/052,630 entitled "SYSTEM AND METHOD FOR STORING CLIENT-SIDE CERTIFICATE CREDENTIALS" filed Mar. 20, 2008, application Ser. No. 12/326,002 entitled "A METHOD AND SYSTEM FOR GENERATING DIGITAL CERTIFICATES AND CERTIFICATE SIGNING REQUESTS" filed Dec. 2, 2008, and Ser. No. 12/419,951 entitled "IDENTITY-BASED CERTIFICATE MANAGEMENT" filed Apr. 7, 2009, each of the disclosures of which are wholly incorporated by reference herein.

Referring back to the block diagram of FIG. 1, once the client computer system 12 gains access to the primary domain 18, various embodiments of the present disclosure contemplate an uninterrupted transition to the secondary domain A 20 and the secondary domain B 22 in accordance with single sign-on. In particular, once the user gains access to the primary domain 18 by providing the requested login credentials thereto, access to the secondary domains 20, 22 are possible without a manual re-submission of the same login credentials. Single sign-on is based on a trust relationship between the primary domain and the secondary domains that the primary domain has completed all of the necessary authentication steps that can be relied upon for the security needs of the secondary domains.

Figure 3:
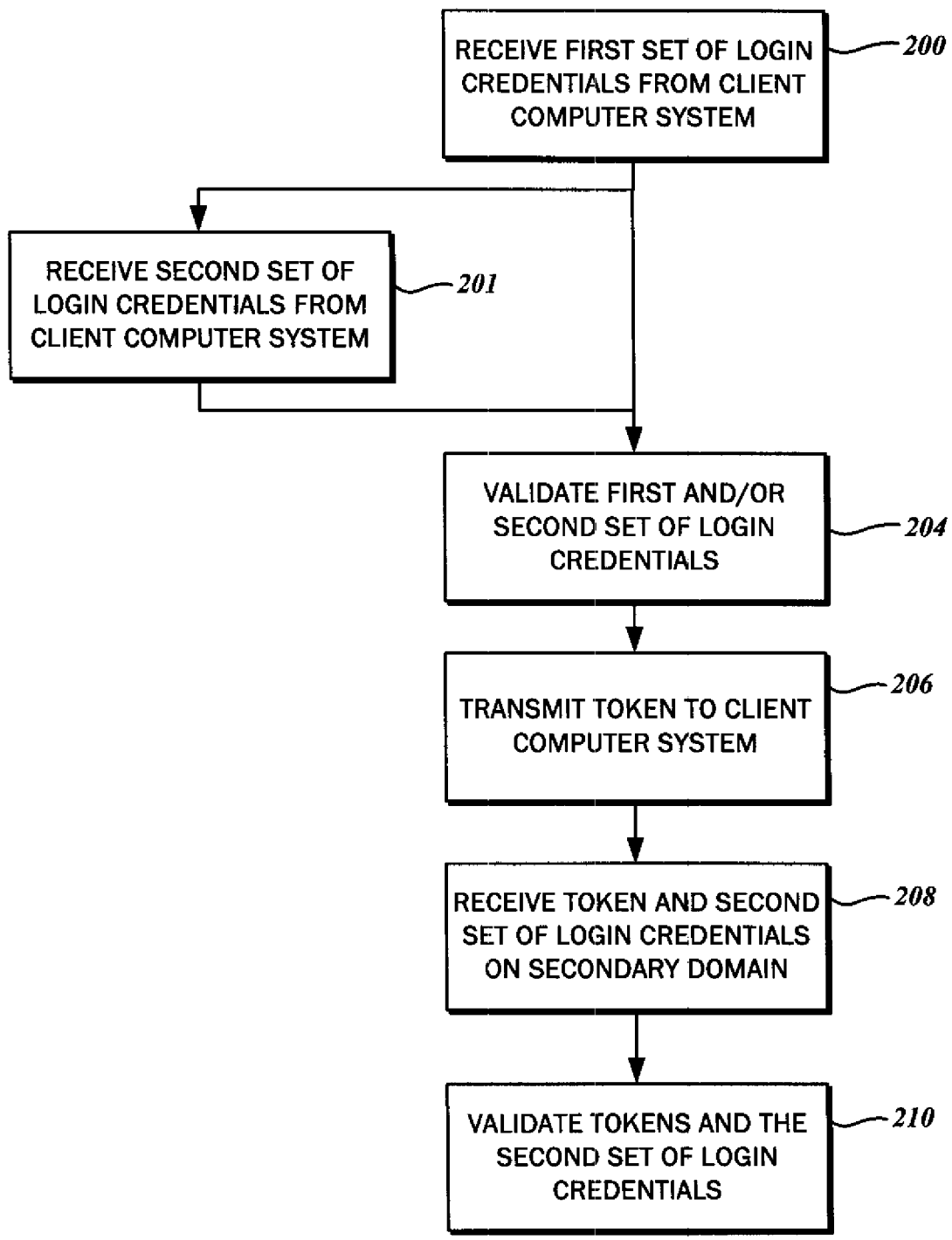
FIG. 3 is a flowchart of another embodiment of the method for authenticating a client to multiple server resources, relative to the multiple server resources.

With reference to the flowchart of FIG. 3, the contemplated method in relation to the enterprise computing resource 14 continues with a step 206 of transmitting to the client computer system 12 a token 68 that is generated by the authentication system 26. The token 68 is generated in response to a successful validation of the first set of login credentials 42 and/or the second set of login credentials 44 per step 104, 204. Additionally, the token 68 may include an account identifier that references an account/user identity in the directory 28. It is understood that the token 68 also refers to any other modality by which the client computer system 12 is indicated as being authenticated by the primary domain 18. These modalities include browser cookie variables that are set to represent the authenticated status, a variable that is resident in memory, an application flag, and so forth. The counterpart method in relation to the client computer system 12 includes a step 106 of storing the token 68 thereon.

According to various embodiments of the present disclosure, the client computer system 12 may transition to the secondary domain A 20 and/or the secondary domain B 22 without an interactive login procedure between the user 13 and the respective authentication systems 32, 38. Referring again to the flowchart of FIG. 2, the method continues with a step 108 of transmitting the token 68 and the second set of login credentials 44 to a secondary domain in the enterprise computing resource 14. As indicated above, the second set of login credentials 44 is different from the first set of login credentials 42, considering that it is a second authentication factor. The token 68 is accepted by the secondary domains 20, 22 as evidence that the session has been properly authenticated by the primary domain 18. The account identifier in the token 68 specifies the account under which the client computer system 12 accesses the secondary domains 20, 22. The counterpart method pertaining to the enterprise computing resource 14 includes a step 208 of receiving the token 68 and the second set of login credentials 44, i.e., the digital certificate 46, on the secondary domains 20, 22.

Upon receipt by the respective authentication systems 32, 38, the client computer system 12 is validated in a step 110 and a corresponding step 210. The validation of the token 68 is understood to be the similar to step 104 and step 204, in which the account identifier is correlated to the entries in the directory 34, 40. Instead of confirming the associated password as in the exemplary implementation of step 104 and step 204, however, the token 68 is understood to serve as partial proof of authentication. The validation of the second set of login credentials 44 is understood to be the same as set forth above in relation to step 104 and step 204. After the validation step, access to the secondary domains 20, 22 is granted.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A method for authenticating a client computer system to multiple server resources each with a standalone authentication system, the method comprising:

enrolling to receive a digital certificate, the digital certificate being associated with the client computer system and a user identity in a centralized directory;

storing the digital certificate on the client computer system;

initiating a web login session with the authentication system of a first server resource of the multiple server resources;

transmitting a first set of login credentials from the client computer system to the authentication system of the first server resource of the multiple server resources;

validating the client computer system to the first server resource of the multiple server resources based upon the first set of login credentials;

in response to successful validation of the client computer system to the first server resource of the multiple server resources, receiving a token from the authentication system of the first server resource of the multiple resources, the token associated with an account identifier referencing the user identity in the centralized directory, the token indicating that the first set of login credentials is associated with the user identity;

storing the token on the client computer system;

accessing server resources associated with the first server resource of the multiple server resources;

transmitting the token and a second set of login credentials comprising the digital certificate, wherein the digital certificate is different from the first set of login credentials, to a second server resource of the multiple server resources, the second set of login credentials being stored on the client computer system prior to transmission of the first set of login credentials to the authentication system of the first server resource of the multiple server resources;

validating the client computer system to the authentication system of the second server resource of the multiple server resources based upon the transmitted token and the second set of login credentials; and in response to successful validation of the client computer system to the authentication system of the second server resource of the multiple server resources, accessing a sub resource associated with the second server resource of the multiple server resources.

2. The method of claim 1, wherein the token is selected from a group consisting of: a browser cookie, a stay resident variable, and an application flag.

3. The method of claim 1, wherein the token includes an account identifier associated with a user account on the first server resource and the second server resource of the multiple server resources.

4. The method of claim 1, wherein the second set of login credentials is an X.509 digital certificate.

5. The method of claim 4, wherein the X.509 digital certificate is stored in a client application.

6. The method of claim 4, wherein the X.509 digital certificate is stored on an external hardware device readable by the client.

7. The method of claim 4, wherein the X.509 digital certificate is associated with a complementary client application of the authentication system of the second server resource of the multiple server resources.

8. The method of claim 4, wherein the X.509 digital certificate is associated with a client application independent of the authentication system of the second server resource of the multiple server resources.

9. The method of claim 1, further comprising:

transmitting the second set of login credentials from the client computer system to the authentication system of the first server resource of the multiple server resources;

wherein the step of validating the client to the first server resource of the multiple server resources is further based upon the second set of login credentials.

10. A method for authenticating a client computer system to multiple server resources each with a standalone authentication system, comprising;

receiving an enrollment request from the client computer system for a digital certificate, the digital certificate being associated with the client computer system and a user identity in a centralized directory;

sending the digital certificate to the client computer system;

receiving a first set of login credentials sent from the client computer system to the authentication system of a first server resource of the multiple server resources;

validating the client computer system to the first server resource of the multiple server resources based upon the first set of login credentials;

transmitting to the client computer system a token generated by the authentication system of the first server resource of the multiple resources in response to a successful validation of the first set of login credentials;

receiving on a second server resource of the multiple server resources the token and a second set of login credentials different from the first set of login credentials, the second set of login credentials being received from the client computer system, the second set of login credentials comprising the digital certificate; and validating the client computer system to the authentication system of the second server resource of the multiple server resources based upon the received token and the second set of login credentials, and allowing access to the second server resource in response to successfully validating the client computer system.

11. The method of claim 10, wherein the token is selected from a group consisting of: a browser cookie, a stay resident variable, and an application flag.

12. The method of claim 10, wherein the token includes an account identifier associated with a user account on the first server resource and the second server resource of the multiple server resources.

13. The method of claim 10, wherein the second set of login credentials is an X.509 digital certificate.

14. The method of claim 13, wherein the X.509 digital certificate is stored on the client computer system.

15. The method of claim 13, wherein the X.509 digital certificate is stored on an external hardware device readable by the client computer system.

16. The method of claim 13, wherein the X.509 digital certificate is associated with a complementary client application of the authentication system of the second server resource of the multiple server resources.

17. The method of claim 13, wherein the X.509 digital certificate is associated with a client application independent of the authentication system of the second server resource of the multiple server resources.

18. The method of claim 10, further comprising:

receiving the second set of login credentials on the primary one of the multiple server resources;

wherein:

the step of validating the client computer system to the first server resource of the multiple server resources is further based upon the second set of login credentials; and the step of transmitting the token is in response to a successful validation of the second set of login credentials.

19. An article of manufacture comprising a non-transitory storage medium readable by a computer, the medium tangibly embodying one or more programs of instructions executable by the computer to perform a method for authenticating a client to multiple server resources each with a standalone authentication system, the method comprising:

receiving an enrollment request from the client for a digital certificate, the digital certificate being associated with the client and a user identity in a centralized directory;

receiving a first set of login credentials sent from the client to the authentication system of a first server resource of the multiple server resources;

validating the client to the first server resource of the multiple server resources based upon the first set of login credentials;

transmitting to the client a token generated by the authentication system of the first server resource of the multiple server resources;

receiving on a second server resource of the multiple server resources the token and a second set of login credentials different from the first set of login credentials, the second set of login credentials being received from the client, the second set of login credentials comprising the digital certificate;

validating the client to the authentication system of the second server resource of the multiple server resources based upon the received token and the second set of login credentials; and in response to successful validation of the client to the authentication system of the second server resource of the multiple server resources, allowing access to at least one sub-resource associated with the second server resource of the multiple server resources.

* * * * *